Figure 1:
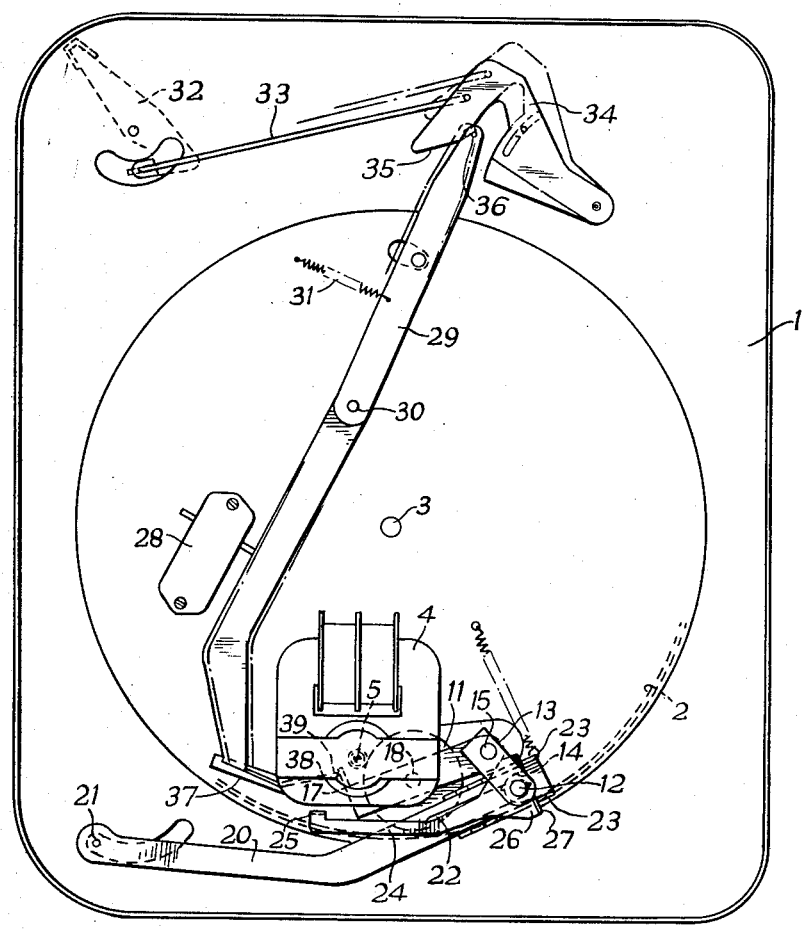

April 4, 1961

L. V. GUEST 2,977,815

CHANGE-SPEED MECHANISM FOR THE TURNTABLE
OF A DISC TALKING MACHINE

Filed Feb. 26, 1959

2 Sheets-Sheet 1

INVENTOR
Lawrence V. Guest
BY
Ralph B. Stewart
ATTORNEY

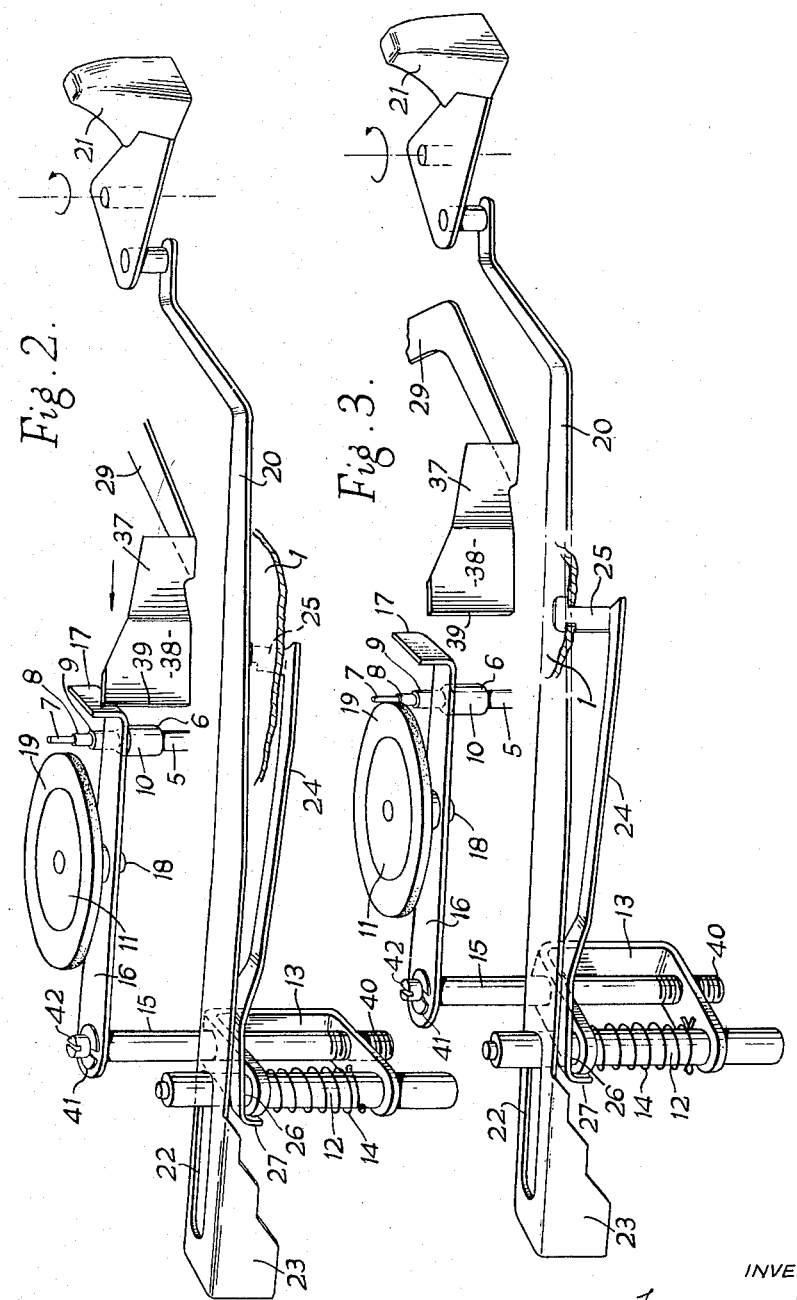

United States Patent Office 2,977,815
Patented Apr. 4, 1961

2,977,815

CHANGE-SPEED MECHANISM FOR THE TURNTABLE OF A DISC TALKING MACHINE

Lawrence Vincent Guest, Old Hill, England, assignor to Birmingham Sound Reproducers Limited, Staffordshire, England Filed Feb. 26, 1959, Ser. No. 795,681

Claims priority, application Great Britain Mar. 5, 1958

5 Claims. (Cl. 74—472)

The present invention relates to an improved change-speed mechanism for the turntable of a disc talking machine of the kind having an "On" "Off" switch for controlling starting and stopping of the electric driving motor, and a change-speed gear comprising a motor-driven stepped or multi-diameter pulley and an idler wheel engaging frictionally between the motor driven pulley and a part of the surface and usually the peripheral surface of the turntable to drive the latter, the idler wheel being movable in one direction axially of the stepped pulley by a manual control and against a return spring for the purpose of engaging the idler wheel with alternative parts of the stepped pulley, and being also movable transversely of the axis of the stepped pulley against or by a spring to enable the idler wheel to be brought out of or into engagement with the stepped pulley.

In accordance with the present invention a change-speed mechanism is provided for the turntable of a disc talking machine of the kind referred to above wherein movement of the idler wheel in the axial direction to transfer the idler wheel from engagement with a smaller to a larger diameter part of the stepped pulley is effected positively by the manual control and in the axial direction to transfer the idler wheel from engagement with a larger diameter to a smaller diameter part of the stepped pulley by the return spring and movable abutments are provided in association with the "On" "Off" switch in the circuit of the driving motor, for moving the idler wheel transversely into the position disengaged from the stepped pulley when the motor switch is moved to the "Off" position and to thereafter retain said idler wheel in said disengaged position but without restraint against axial gear-change movement of the idler wheel in either direction, while said switch remains in the "Off" position.

The idler wheels of gear-change mechanisms of the kind referred to are usually formed of resilient material or provided with rims or tyres of resilient material e.g. rubber and the changes in diameter between adjacent parts of the stepped pulley are small.

With the motor and pulley running, speed changes involving movement of the idler wheel from a small to a larger diameter part of the pulley can be readily effected by positive action upon the idler wheel carrier from the manual control. With the motor and pulley stationary however, this movement becomes more difficult due to the need to force the rim or tyre of the idler wheel past a stationary shoulder on the pulley and this difficulty is overcome in accordance with the present invention by maintaining the idler wheel away from engagement with the pulley whilst the latter is stationary, by means of the movable abutment. The movable abutment is of a form to provide a guide for the idler wheel carrier during gear changing movements whilst held away from the pulley.

Movements of the idler wheel in the direction for transfer from a larger diameter part to a smaller diameter part of the pulley can be readily effected by a light spring whether the idler wheel is engaged with the stepped pulley or not.

In some cases a short cone section is provided at some or all of the junctions between parts of the pulley of different diameter.

An embodiment of the invention is illustrated by way of example in the accompanying drawings in which:

Fig. 1 is an underside plan view of a talking machine and the parts disposed at the underside of the motor board thereof, Figs. 2 and 3 are views in perspective showing the improved change-speed mechanism, in two alternative positions.

Referring to Fig. 1, 1 is a motor board, usually a short metal plate, above which is mounted a conventional turntable a part of the peripheral rim of which is indicated in dotted lines at 2, for rotation about a central spindle 3, and the usual pick-up arm and pick-up (not shown).

A constant speed motor 4 is suspended in fixed position from the underside of the motor board, with its driving spindle 5 extending vertically above the motor board 1 and beneath the turntable, the upper end of the spindle 5 being shaped to form, or being provided with a fixed stepped pulley 6. The pulley 6 in the case illustrated is formed with four parts 7, 8, 9, 10 of progressively increasing diameters with the smallest diameter uppermost, the diameters for the four parts being selected according to the required speeds to be imparted to the turntable from the constant speed motor 4 through a single friction idler wheel 11 capable of engagement between any selected one of the parts 7, 8, 9 or 10 of the stepped pulley 6 and the inner surface of the peripheral rim 2 of the turntable.

The mounting of the idler wheel 11 to enable it to be moved from a position for engagement with one of the parts 7, 8, 9 or 10 of the stepped pulley 6 into a position for engagement with another of those parts of the pulley 6 is as follows:

From the underside of the motor board 1 depends a fixed vertical spindle 12 and on this spindle 12 is mounted a yoke piece 13, the arms of the yoke piece being apertured to provide a free guided sliding fit for the yoke piece on the spindle 12. The spindle 12 between the limbs of the yoke piece 13 is surrounded by a light compression spring 14 the lower end of which is anchored to the spindle 12 so that the spring 14 tends to raise the yoke piece 13 along the spindle. The upper end of the spring 14 is also anchored to the upper limb of the yoke piece 13 so that the spring functions as a torsion spring tending to maintain the yoke piece in a given rest position about the axis of the spindle 12.

The yoke piece 13 carries a further vertical spindle 15 for movement up and down with said yoke piece, the spindle 15 also being capable of rotation about its own axis in the yoke piece. The vertical spindle 15 extends upwards through the motor board 1 and to the upper end thereof is fixed a horizontal arm 16 extending through the gap between the motor spindle 5 and the peripheral edge 2 of the turntable, and the free end of the arm is provide with an upturned vertical lug 17. The idler wheel 11 is mounted for rotation in a horizontal plane about a fixed bearing pin 18 on the arm 16, the idler wheel having an edge rim 19 of small thickness less than the axial length of any of the parts 7, 8, 9 and 10 of the stepped pulley 6, and relatively large radial width formed of rubber or like elastic frictional material capable of limited yield.

On the underside of the motor board 1 is mounted a sliding bar 20 movable by means of a hand control knob 21 accessible from above the motor board 1.

The sliding bar 20 is of inverted channel section at its free end and the bottom of the channel portion is provided with an elongated slot 22 in guided engagement over the upper end of the fixed spindle 12, whilst the edges of the side walls 23 of the channel portion are similarly stepped as shown in Figs. 2 and 3 to provide cams for engagement above the upper limb for the yoke piece 13.

A strip of spring metal 24 is affixed at one end thereof to the motor board 1 by engagement of a hook 25 thereon in a hole in the motor board 1 so that the free end thereof is biased upwards into engagement with the underside of the bar 20 to hold the latter in light rubbing engagement with the under surface of the motor board 1. The free end of the strip 24 is forked as shown at 26, the fork engaging over the upper limb of the yoke piece 13 and embracing the spindle 12. The ends of the limbs of the fork 26 are down-turned to form smooth flanges as shown at 27.

On the underside of the motor board 1 is mounted an electric switch 28 for starting and stopping the motor 4, the switch being operated by a lever 29 movable about a pivot 30, in one direction by a spring 31 to open the switch and in the other direction by means of a hand controlled knob 32 accessible from above the motor board 1 and operating through a rod 33 and a slotted latch lever 34 to close the switch 28.

The latch lever 34 is provided with a cam end 35 engaging with a pin 36 on the lever 29 to move the lever 29 against the spring 31 to close the switch 28 upon movement of the hand control knob 32 in one direction, the lever 29 and the latch lever 34 being mutually retaining under the pull of the spring 31 with the switch 28 in the closed position.

In the case of an automatic machine capable of playing a number of records in succession, the latch lever 34 may be moved automatically to open the switch 28 on completion of playing of all the records in the manner fully described in the specification of our co-pending application No. 793,119 filed February 13, 1959.

The switch lever 29 is provided with a lateral extension 37 on the end remote from the control knob 32, the extension 37 terminating in a lug 38 having an elongated vertical straight edge 39 presented towards the lug 17 on the free end of the horizontal lever 16 carrying the idler wheel 11.

The operation is as follows:

With the switch 28 open and the machine at rest the switch control lever 29 occupies the position shown in dotted lines in Fig. 1 and the vertical edge 39 of the guide lug 38 on the end of lever 29 has engaged the lug 17 on the end of the horizontal lever 16 and moved that lever against the torsional urge of the spiral spring 14 upon the yoke piece 13 on the spindle 12 to the position shown in Fig. 2 so that the idler wheel 11 is held away from engagement with the stepped pulley 6.

Retention of the idler wheel 11 in this disengaged position avoids possible deterioration of the idler wheel 11 by deformation of its rubber rim or tyre 19 such as would occur if left in pressure engagement with the stepped pulley 6 for lengthy rest periods.

With the idler wheel 11 in this disengaged position adjustments of the idler wheel up or down to select a given speed for the turntable 2 as a preliminary to starting up the machine, can be freely made by manipulation of the hand control knob 21 to engage one or another of the steps on the channel-section end of the member 20 over the forked end 26 of the spring strip 24 to vary the vertical height of the yoke piece 13 and therefore of the spindle 15 and the idler-wheel-carrying horizontal arm 16 carried thereby relative to the fixed vertical spindle 12, the lug 17 on the end of the horizontal arm 16 sliding freely along and being guided by the vertical edge 39 of the lateral extension 37 on the switch control lever.

Operation of the hand switch control 32 to rock the latch member 34 to permit the switch control lever 29 to move to the position shown in full lines in Fig. 1 under the pull of the spring 31 to close the switch 28 to start the motor 4 and at the same time the guide lug 37 is moved to withdraw the edge 39 from the lug 17 so that the torsion of the spring 14 is permitted to take effect to rock the yoke member 13 about the fixed vertical spindle 12 together with the spindle 15 and horizontal arm 16 to urge the idler wheel into engagement with the selected part 7, 8, 9 or 10 of the stepped pulley 6 as shown in Fig. 2 and also with the peripheral rim 2 of the turntable so that the turntable is set in rotation at the required speed.

With the turntable running speed changes can be carried out without stopping the motor, the speed-change hand control knob 21 being operated to move the member 20 in either direction, movement in one direction urging the yoke-piece 13 positively downwards against the compression of the spring 14 and movement in the other direction permitting the yoke piece 13 to rise under the lift of the spring 14.

With the stepped pulley 6 in rotation a positive downward thrust upon the yoke piece 13 in conjunction with the resilience of the rubber rim or tyre 19 of the idler wheel 11 permits easy and certain transfer of the engagement of the idler wheel 11 from a part of the stepped pulley 6 of one diameter to a part of larger diameter.

Transfer of engagement from a larger to a smaller diameter part of the stepped pulley 6 is also effected with certainty by the compression spring 14 when the latter is permitted to expand by movement of member 20 in the appropriate direction.

In some cases the junctions between some or all of the several parts 7, 8, 9 and 10 of the stepped pulley 6 may be of tapered or coned form to further assist the transfer of the idler wheel 11 to a part of the pulley of larger diameter.

Such speed change mechanisms utilising stepped pulleys, and particularly those having as many as four parts of different diameters, require the initial setting of the position of the idler wheel with reference to the stepped pulley to be effected with some accuracy.

For this purpose in the mechanism according to the present invention, the spindle 15 supporting the horizontal idler-wheel-carrying arm 16 is screw threaded at its lower end as shown at 40 and engages in a threaded hole in the lower limb of the yoke piece 13.

The arm 16 is apertured and seated upon a shoulder formed at the upper end of the spindle 15 and is held in position on the shoulder by a stiff spring washer 41 engaged in a circumferential slot in the spindle 15. The upper end of the spindle 15 is provided with a screw driver slot 42.

Thus with the aid of a screw driver vertical adjustment of the horizontal arm 16 and the idler wheel relative to the yoke-piece 13 can be effected, the frictional engagement between the washer 41 and the horizontal arm 16 being temporarily overcome.

The screwed engagement between the lower end 40 of the spindle 15 and the lower limb of the yoke piece 13 is such as to permit the free rocking of the spindle 15 about its own axis to permit the horizontal arm 16 and the idler wheel to adjust themselves transversely in the varying gap between the stepped pulley 6 and the turntable rim 2.

The angular extent of such rocking movement represents no more than a small fraction of a full turn of the spindle 15 and is without material effect upon the initial setting of the vertical position of the idler wheel in relation to the stepped pulley.

I claim:

1. A change-speed driving mechanism for the turntable of a disc talking machine, comprising a motor, a stepped pulley driven by said motor, a flexible idler wheel in friction engagement between said stepped pulley and the turntable, a substantially horizontal arm carrying said idler wheel, a fixed vertical spindle, supporting means carrying said substantially horizontal arm and movable up and down said fixed vertical spindle, a spring urging said supporting means along said fixed vertical spindle in the direction from a larger to a smaller part of said stepped pulley and manually operated control means engageable with said supporting means for positively moving it in opposition to said spring along said fixed vertical spindle in the direction from a smaller to a larger part of said stepped pulley with the flexible idler wheel in engagement with the said stepped pulley.

2. A change-speed driving mechanism for the turntable of a disc talking machine, comprising a motor, a stepped pulley driven by said motor, a flexible idler wheel in frictional engagement between said stepped pulley and the turntable, a substantially horizontal arm carrying said idler wheel, a fixed vertical spindle, supporting means carrying said substantially horizontal arm and movable both up and down and rotationally about said fixed vertical spindle, a spring urging said supporting means along said fixed vertical spindle in the direction from a larger to a smaller part of said stepped pulley, and rotationally about said fixed vertical spindle in the direction engaging said idler wheel with said stepped pulley and manually operated control means engageable with said supporting means for positively moving it in opposition to said spring along said fixed vertical spindle in the direction from a smaller to a larger part of said stepped pulley with the flexible idler wheel in engagement with the said stepped pulley.

3. A change-speed driving mechanism for the turntable of a disc talking machine, comprising a motor, a stepped pulley driven by said motor, an On-Off switch controlling said motor, a first manual control means operating said switch, a flexible idler wheel in frictional engagement between said stepped pulley and the turntable, a substantially horizontal arm carrying said idler wheel, a fixed vertical spindle, supporting means carrying said substantially horizontal arm and movable up and down said fixed vertical spindle, a spring urging said supporting means along said fixed vertical spindle in the direction from a larger to a smaller part of said stepped pulley, a further manually operated control means engageable with said supporting means for positively moving it in opposition to said spring along said fixed vertical spindle in the direction from a smaller to a larger part of said stepped pulley with the flexible idler wheel in engagement with the said stepped pulley, and a movable abutment member movable in response to movements of said first manual control means for said switch, said abutment member including a vertical edge-forming portion for abutting and moving said substantially horizontal arm to a position in which the said idler wheel is disengaged from the stepped pulley as the said first manual control means is moved to move the switch to the "Off" position and guiding the said substantially horizontal arm and the idler wheel carried thereby in up and down movements thereof by the said further manual control while said switch remains in the "Off" position.

4. A change-speed driving mechanism for the turntable of a disc talking machine, comprising a motor, a stepped pulley driven by said motor, a flexible idler wheel in frictional engagement between said stepped pulley and the turntable, a substantially horizontal arm carrying said idler wheel, a fixed vertical spindle, supporting means carrying said substantially horizontal arm and movable up and down said fixed vertical spindle, a spring urging said supporting means along said fixed vertical spindle in the direction from a larger to a smaller part of said stepped pulley and a manual control means including a vertically stepped bar guided by said fixed vertical spindle for horizontal movement relative thereto for engaging and moving said supporting means positively in opposition to said spring along said fixed vertical spindle in the direction from a smaller to a larger part of said stepped pulley with the flexible idler wheel in engagement with the said stepped pulley.

5. A change-speed driving mechanism for the turntable of a disc talking machine as claimed in claim 1 wherein the supporting means carrying said substantially horizontal arm comprises a yoke member having upper and lower limbs slidable along said fixed vertical spindle and a further vertical spindle carried in the limbs of the yoke member and screw threaded into one of said limbs, and yieldable means securing the substantially horizontal arm carrying the said idler wheel to the upper end of said further vertical spindle.

References Cited in the file of this patent
UNITED STATES PATENTS

| | | |
|---|---|---|
| 2,254,066 | Gruber et al. | Aug. 26, 1941 |
| 2,260,289 | Brady et al. | Oct. 28, 1941 |
| 2,588,807 | Costa | Mar. 11, 1952 |